(12) United States Patent
Circenis et al.

(10) Patent No.: US 7,571,143 B2
(45) Date of Patent: Aug. 4, 2009

(54) SOFTWARE PAY-PER-USE PRICING

(75) Inventors: Edgar Circenis, Loveland, CO (US);
Glenn Miller, Sunnyvale, CA (US);
Robert C. Lehr, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1728 days.

(21) Appl. No.: 10/045,149

(22) Filed: Jan. 15, 2002

(65) Prior Publication Data

US 2003/0135474 A1    Jul. 17, 2003

(51) Int. Cl.
*G06F 17/00*    (2006.01)
(52) U.S. Cl. ....................................................... 705/400
(58) Field of Classification Search ........................ None
See application file for complete search history.

(56) References Cited

U.S. PATENT DOCUMENTS

| | | | | |
|---|---|---|---|---|
| 4,791,565 | A * | 12/1988 | Dunham et al. | 726/31 |
| 5,758,069 | A * | 5/1998 | Olsen | 726/27 |
| 6,049,789 | A * | 4/2000 | Frison et al. | 705/59 |
| 2002/0022971 | A1* | 2/2002 | Tanaka et al. | 705/1 |
| 2002/0083003 | A1* | 6/2002 | Halliday et al. | 705/52 |
| 2002/0161717 | A1* | 10/2002 | Kassan et al. | 705/59 |
| 2003/0083994 | A1* | 5/2003 | Ramachandran et al. | 705/52 |

OTHER PUBLICATIONS

"IBM ships OS to support usage-based pricing model", Computerworld v35n14 pp. 50, Vijayan Jaikumar, Apr. 2, 2001.*
"Software licensing", Ohio CPA Journal v55n3 pp. 40-42, Bober, Mark, Bauchner Joshua, Jun. 1996.*
"SiteMeter helps you keep your software usage aboveboard." PC Magazine, v12, n22, pNE32(1), Rigney, Steve, Dec. 21, 1993.*

* cited by examiner

*Primary Examiner*—John W Hayes
*Assistant Examiner*—Rob Wu

(57) ABSTRACT

A pay-per-use (PPU) software system uses reads metrics data from one or more PPU products and transmits the metrics data to a remote location for processing. The PPU system uses a utility metering appliance that monitors PPU software products on a given internal network through the use of software metering agents that reside on different computers. Metric gathering tools are supplied with the PPU software products and are registered with an agent. The utility metering appliance polls all of the software metering agents, which collect software metrics data from the registered tools. Each agent transmits the data back to the utility metering appliance, where it is stored for periodic transmission to a usage collection and billing system. The usage collection and billing system then forwards the metrics data to a billing computer so that a bill can be issued to the software product user. The software metrics data may also be forwarded to a portal for customer tracking of PPU product usage.

9 Claims, 3 Drawing Sheets

SOFTWARE PAY-PER-USE PRICING

TECHNICAL FIELD

The technical field is in intelligent collection and monitoring of software metrics in a multi-computer environment with a plurality of software packages.

BACKGROUND

Traditional models for acquisition, use, and payment of software require a customer to pay for an expected number, or instances, of a software product that is intended to operate on the customer's computer network or system. For example, a customer desiring to provide a word processing software product for use by the customer's employees will generally pay for one copy of the software product for each of the customer's employees that will use the software product. Such payment may give the customer a license to use the software product at each of the employee work stations. The license typically prohibits copying and further distribution of the software product to other employees of the customer. The customer, moreover, pays a full price for each license thus obtained.

However, some or all of the customer's employees may use the software product only on a part-time basis. Thus, the customer in effect pays for excess capacity to ensure all of the customer's desired employees have access to the software product. As an alternative, the customer could acquire a limited number of software product licenses. In this alternate arrangement, some customer employees may not be able to use the software product when needed or desired, thereby reducing the work output of the customer.

Finally, the customer's hardware needs may change rapidly. Acquisition or disposal of hardware may affect the number of software licenses the customer needs to have in place. By having to separately purchase additional licenses of the software product, the customer may experience delays before the newly acquired hardware is fully functional.

SUMMARY

A pay-per-use (PPU) approach could apply to the pricing and leasing of large-scale software products. In a traditional purchase model, some software products also require a large capital outlay for their purchase, depending on the size of the software products and the use of the software products. Such software products pose technical and logistical obstacles to being priced using a PPU approach. Different software vendors may develop software products without a standard method for collecting or transmitting software usage/metrics data. Different software vendors may want to collect different metrics such as number of users or central processing unit (CPU) utilization. Each computer could have multiple different PPU software products to meter and monitor, thereby increasing the complexity of any software PPU approach.

Current software manufacturers may issue licenses that are limited to a fixed number of users, operators or other metrics. Such licenses may not reflect the changing needs of the customer, requiring further interaction between the software vendor and the customer. For example, a customer who has already purchased a ten-user license cannot add an eleventh user instantly without having to go back to the vendor for more licenses. Neither can the customer instantly reduce costs by switching to a 5-user license if customer needs so dictate.

The PPU approach includes a software metering system and method that solves these problems by providing a way for reliably measuring and billing for software product usage while allowing each PPU software vendor to measure and bill based on the metrics that are appropriate for that PPU software vendor. The software metering system includes a computer with a PPU software product, where metrics data may be collected from the PPU software product and where the metrics data may be transmitted to a remote location.

DESCRIPTION OF THE DRAWINGS

The detailed description will refer to the following drawings, wherein like numerals refer to like elements, and wherein.

DETAILED DESCRIPTION

Figure 1:
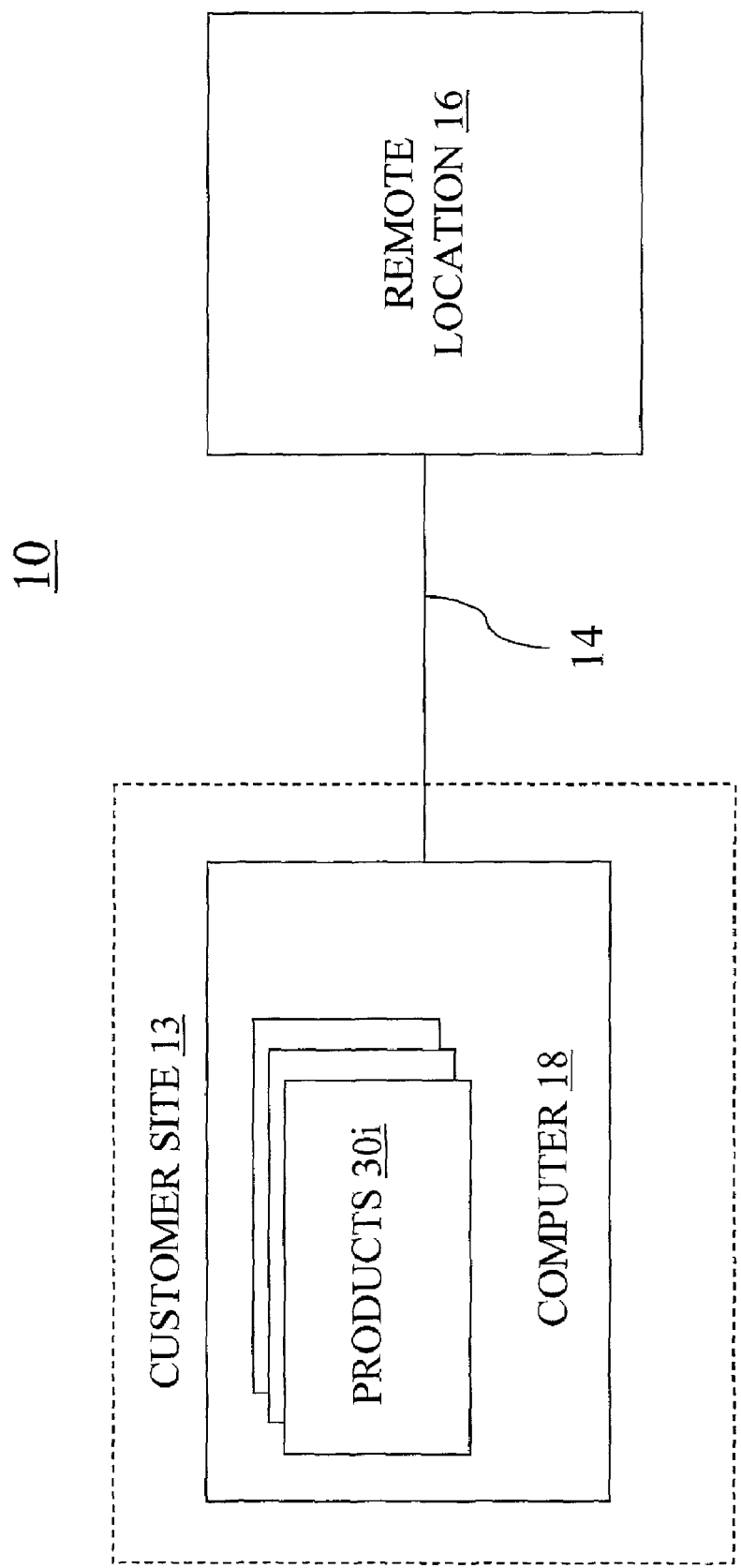
FIG. 1 is an overview of a pay-per-use (PPU) software metering system according to one embodiment.

FIG. 1 is block diagram of a pay-per-use (PPU) system 10 that allows flexible dynamic pricing of products 30i. In an embodiment the products 30i may be PPU software products installed on a computer 18 at a customer site 13. The flexible pricing of the products 30i is supported by collecting metrics (or usage) data from the products 30i and transmitting metrics data over an external network connection 14 to a remote location 16, which may incorporate mechanisms for billing and payment collection.

The customer site 13 may include mechanisms for monitoring, collecting, preprocessing and transmitting the metrics data. In an embodiment, some or all of the mechanisms may be incorporated into the products 30i. In an alternate embodiment, separate devices (not shown) may be included at the customer site 13 for completing the functions of monitoring, collecting, pre-processing and transmitting the metrics data.

Figure 2:
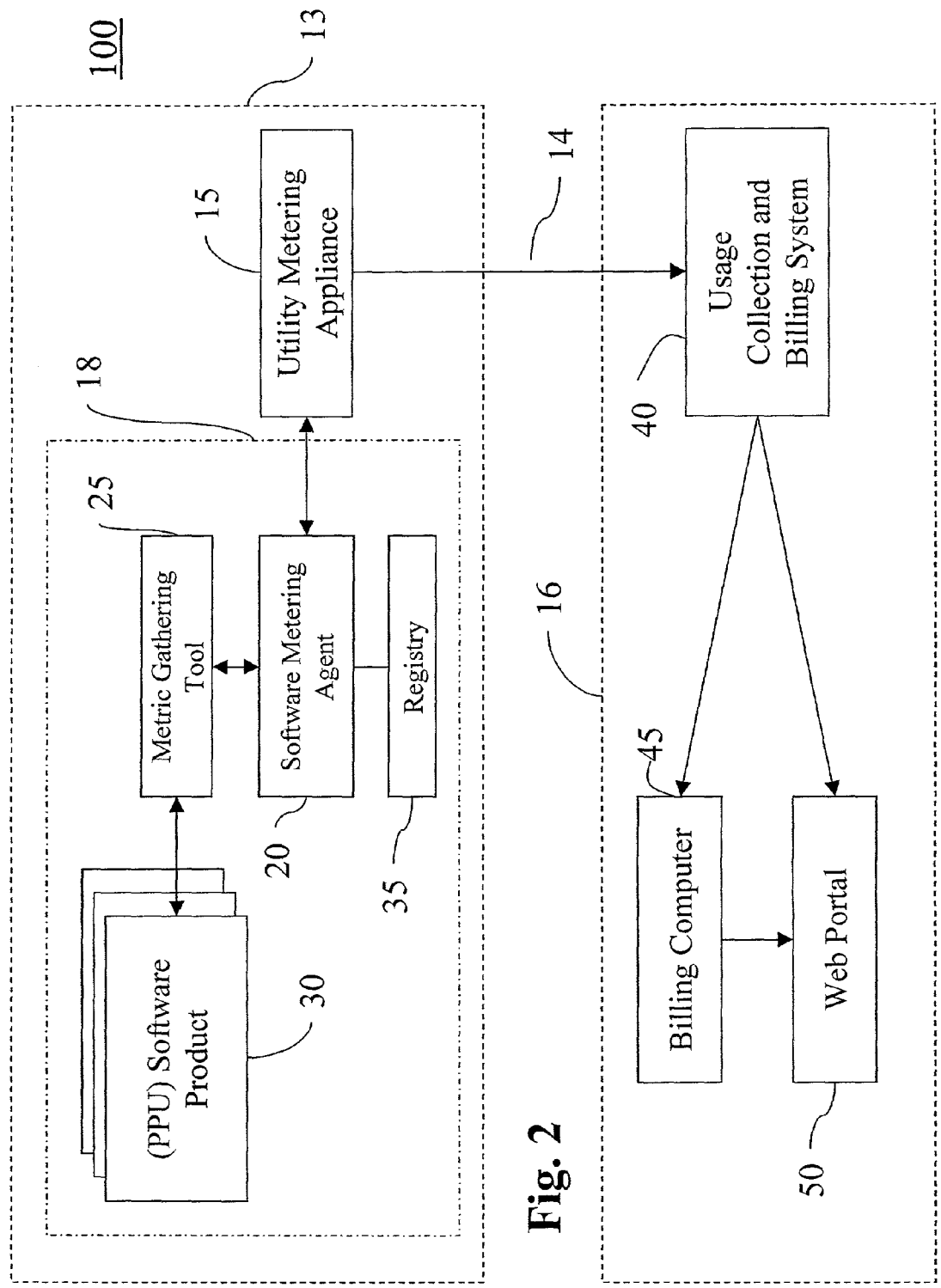
FIG. 2 illustrates different components of a software metering system according to one embodiment.

FIG. 2 is a detailed block diagram of a software PPU system 100. The customer site 13 may include a computer 18 with at least one PPU software product 30. The computer 18 may include a software metering agent 20 and/or a metric gathering tool 25 for performing the collection and monitoring functions. The customer site 13 may include a utility metering appliance connected to the computer 18 for collecting and transmitting metrics data through the external network connection 14. The vendor site 16 may include a usage collection and billing system 40. The vendor site 16 or a third party vendor site (not shown) may further include a billing computer 45 and a web portal 50.

The utility metering appliance 15 may govern collection of software metrics data for an internal network on the customer site 13. The utility metering appliance 15 itself may not directly collect metrics data from each PPU software product 30 on the internal network, but rather may rely on mechanisms such as the software metering agent 20, which is a software program that resides on each computer 18 (or each instance of the operating system in computers running multiple instances of the operating system). The software metering agent 20, in turn, receives metrics data from at least one, and often more than one, metric gathering tool 25. The metric gathering tool 25 may be provided by the PPU software product vendor or another vendor, and may be responsible for the collection of metrics data from each PPU software product 30.

The utility metering appliance 15 itself may run as a process on another computer, including one of the computers 18 running PPU software products 30, but for network efficiency, the utility metering appliance 15 may be implemented on a standalone computer, or on a server that is used for similar administrative tasks. The utility metering appliance 15 may be implemented as a component device in a rack mountable system, or as software running on a rack mountable system, or may be implemented on a completely separate computer system. The utility metering appliance 15 is not resource-intensive and may generally be run on a less powerful computer.

The customer site 13 may have multiple computers 18, each of which has the software metering agent 20 for collecting PPU metrics data from the PPU software products 30 residing on that computer 18. The utility metering appliance 15 may communicate with the software metering agent 20 through a network management protocol such as Simple Network Management Protocol (SNMP) or Web-Based Enterprise Management (WBEM) protocol, both of which allow polling of information. The utility metering appliance 15 and software metering agent 20 also can communicate using the similar Desktop Management Interface (DMI), a framework for network management. The utility metering appliance 15 and the software metering agent 20 may also communicate and transmit data using protocols that are not specifically dedicated to network management, such as Hypertext Transport Protocol (HTTP) or Secure HTTP (HTTP/S), provided that the utility metering appliance 15 can effectively communicate data to and from the software metering agent 20 using the particular network protocol.

The exact implementation of the software metering agent 20 will depend on the particular communication protocol being used. In an SNMP implementation, the software metering agent 20 is implemented as an SNMP agent or subagent. If WBEM/DMI is the communication protocol, a WBEM/DMI data provider serves as the software metering agent 20. A common gateway interface (CGI) program accessible to a web server could be used as the software metering agent 20 if HTTP or HTTP/S is used as the communication protocol. The collection function of the metric gathering tool 25 may also be performed directly by the software metering agent 20.

The software metering agent 20 may be part of the operating system of the computer 18 and may include a registry 35 that contains information about the PPU software products 30 running on that computer 18 (or instance of the operating system). The registry 35 may be a flat-file database containing the names of all of the PPU software products 30 as well as the pathname of the metric gathering tool 25 associated with each PPU software product 30. The software metering agent 20 reads the registry 35 in order to access the metric gathering tool 25 so that the metering agent 20 can collect the necessary metrics data.

Metrics data returned by the software metering agent 20 may use a standardized data structure such as one specified by a management information base (MIB) for SNMP or by the Managed Object Format (MOF) for WBEM. In a SNMP implementation, for example, the MIB can be specified for returning certain data such as the name of the software, an array of variable names, and their values. The MIB would then be compiled into a data structure and downloaded to the software metering agent 20 (implemented, for example, as a SNMP subagent) where the data structure would be used in collecting data. Other data structures may be used to implement the transfer of data between the software metering agent 20 and the utility metering appliance 15.

The metric gathering tool 25 may be an executable command or an executable script that gathers software metrics data for the PPU product 30 or, if the metric gathering tool 25 is also acting as software metering agent 20, an SNMP agent or other data provider. The PPU software product vendor or another vendor may be responsible for developing or customizing the metric gathering tool 25 to suit its software product in the development of the PPU software product 30. For example, some conventional software products inherently gather some types of metrics data that can be extracted by a properly configured metrics gathering tool 25. In another example, a conventional software product may need to be modified to make the conventional software product operable with metrics data. In this case, the conventional software product is PPU-enabled by either integrating the metric gathering tool 25 into the software product or modifying the software and the independent metric gathering tool so that the software product and the metric gathering tool cooperatively provide the desired metrics data. The particular metrics being gathered depend on the PPU software product 30 being used and the particular business model for charging for software usage. One type of metric that may be collected by the metric gathering tool 25 is a snapshot metric, which represents a snapshot of the current state of the system. One common type of snapshot metric, for example, is the number of users using the PPU software product 30 at any given time. Cumulative metrics, which measure the total accumulated value of a given parameter, may also be collected by the metric gathering tool 25 such the number of transactions or the number of files being produced for a given predetermined time interval. CPU utilization by the PPU software product 30, or execution time by the PPU software product 30 may also be collected. The metric gathering tool 25 may also collect metrics such as whether a PPU software product 30 was used at all, for licenses that depend on simply whether a product was used during a given period of time. Finally, the metric gathering tool 25 may collect I/O metrics such as number of I/O reads or writes for I/O-intensive PPU software products 30.

Different types of PPU software products 30 may require different types of software metrics data. Moreover, different vendors may want to collect different types of software metrics data. Consequently, the vendor of any given PPU software product 30 will generally control and specify what metrics are collected by the metric gathering tool 25 as well as how the metrics are collected. For example, a first vendor may design the metric gathering tool 25 to measure all or some of the following metrics specific to the PPU software product 30: the number of users, number of users of a given type, software license level, transactions processed per minute, total number of transactions processed, number of files created, sizes of those files created, number of keystrokes, number of times a specific software product feature has been accessed, number of managed nodes, or some other quantity representative of the value the user derives from the use of the PPU software product 30. On the other hand, a first or second vendor may design the metric gathering tool 25 to measure whether the PPU software product 30 is currently executing, the number of active CPUs on a system, the speed of those CPUs, the amount of memory in the system, the amount of wall clock time for which the PPU software product 30 has been executing, the cumulative CPU time for the PPU software product 30 or some other quantity representative of the value the user derives from the use of the first vendor's PPU software product 30. This latter list of metrics data types typically do not require in-depth knowledge of the function or internal operations of the PPU software product 30.

The metric gathering tool 25 may return software metrics data in a specific pre-determined data interface, such as a colon-separated variable text format or rows of variable/value groups, that is compatible with the software metering agent 20. The software usage data may be in binary format but is more likely to be in text format. The system vendor could provide a developer kit to software vendors documenting the interface requirements for the metric gathering tool 25 and providing some source or object code for specifying commonly measured metrics data such as the ones listed above so that the software vendor may enable their software products for PPU. The developer's kit could also provide programming code for a generic metric gathering tool that the software vendor may customize to create a metric gathering tool 25 specific to the PPU software. The metric gathering tool 25, once it is completely developed, may then be packaged with both the PPU software product 30 and a control script or application that, when executed, will register the particular software product 30 with the software metering agent 20.

Each software metering agent 20 gathers metrics data from the metric gathering tools 25 for all of the PPU software products 30 registered with that software metering agent 20, and transmits the collected software metrics data to the utility metering appliance 15. The utility metering appliance 15 then periodically transmits the metrics data to a usage collection and billing system 40, possibly through a web server (not shown). The usage collection and billing system 40 will typically be maintained and kept at a vendor location, and will often contain data for many customers. The usage collection and billing system 40 will then forward the software metrics data to at least one billing computer 45 for billing the customer. The system vendor for software applications would control the billing computer 45 for its own PPU software products, but other third-party software vendors could have separate billing computers 45 for billing the customer. The billing computer 45 may generate notifications based on business rules specified by the vendor of the PPU software product or another vendor. The notifications may be formal bills or may be reminders to the customer to submit payment. The web portal 50 may also be used for providing user-friendly access for either the customers or the system vendor personnel to information based on data generated from the billing computer 45 and from the usage collection and billing system 40.

The PPU software product 30 may be configured for PPU usage by registering the metric gathering tool 25 for the PPU software product 30 with the software metering agent 20 on the computer 18 that is running the PPU software product 30. The PPU software product vendor may provide a registration application or registration script that links the software product 30 and its accompanying metric gathering tool 25 with the software metering agent 20. The registration process may include executing the metric gathering tool 25 to verify that the tool 25 correctly returns data to the software metering agent 20. The PPU software product 30 is ready for metering PPU usage once the registration process is completed.

Figure 3:
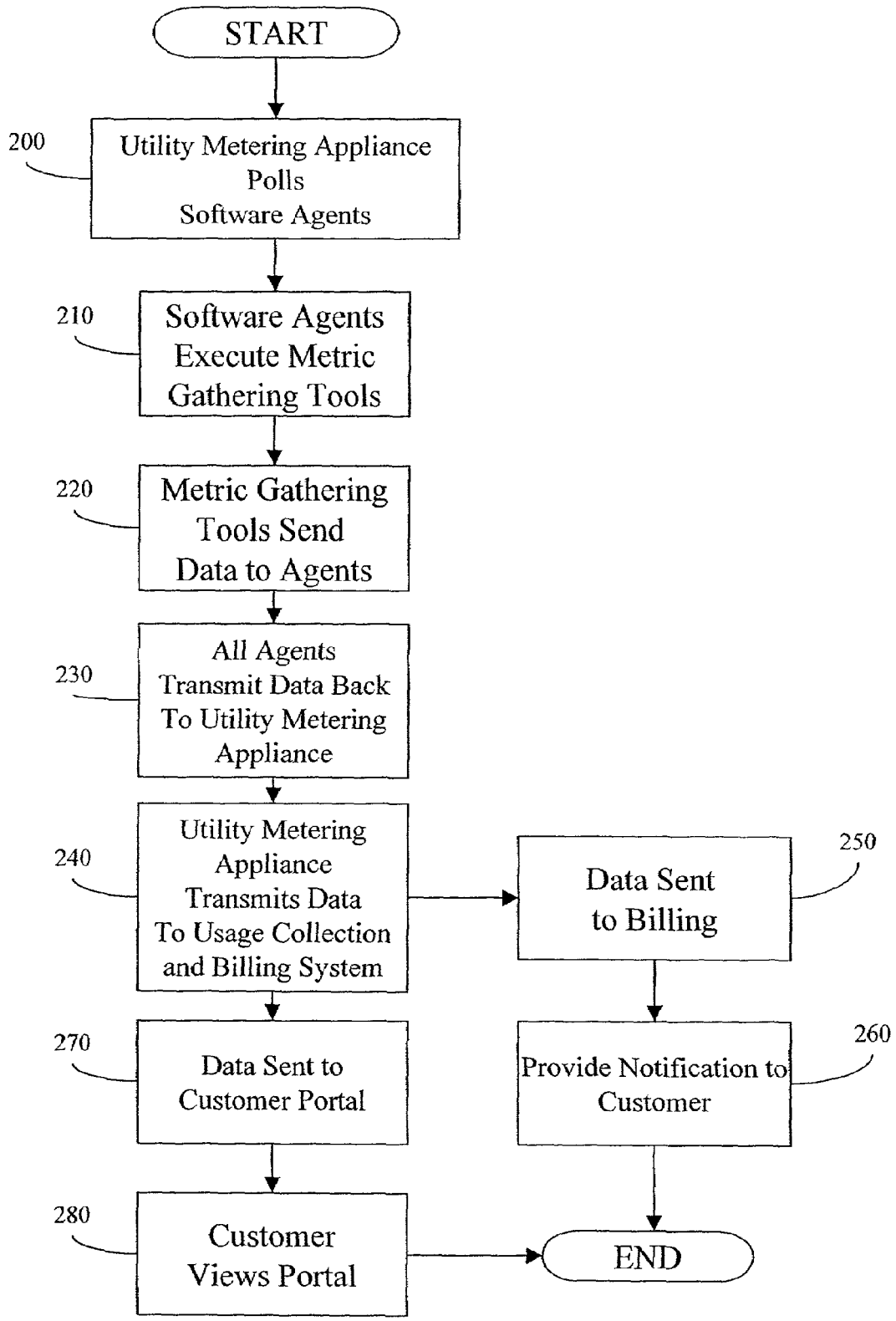
FIG. 3 is a flowchart illustrating one embodiment by which the process by which software metering data is collected.

Referring to FIG. 3, one embodiment for collecting software metrics data from PPU software products 30 begins when the software metering agents 20 return metrics data to the utility metering appliance 15 at different intervals during the day. The utility metering appliance 15 may periodically poll the software metering agents 20 found on the network (step 200). Each software metering agent 20 may have its own polling interval as each agent 20 could conceivably regulate different types of PPU products. Each software metering agent 20 will then execute the metric gathering tools 25 linked in the registry 35 and collect the resulting software metrics data (step 210); the software metrics data may include information on transactions, CPU usage, or any metric that the PPU software product vendor deems to be pertinent in calculating usage. To expedite communications, the metric gathering tool 25 returns the software metrics data in a standardized format that can be read by the software metering agent 20 (step 220).

Alternately, the utility metering appliance 15 may rely on the software metering agents 20 to provide the data without polling. In this embodiment, the software metering agents 20 collect data from the metric gathering tools 25 at collection intervals and initiate communication with the utility metering appliance 15. The utility metering appliance 15 may be set to receive metrics data from the software metering agents 20. The utility metering appliance 15 and software metering agent 20 may also be combined so that the usage meter 15 calls the metric gathering tools 25 directly.

The utility metering appliance 15 may collect metrics data from the software metering agents 20 several times per hour, depending on the type of metrics data that is being collected. For example, the utility metering appliance 15 may be set to collect data from the software metering agents every 20 minutes for a total of 72 intervals per day. Other collection intervals, however, may be specified depending on what type of software metrics data is being collected. Frequent collection is recommended for snapshot metrics; however, frequent polling would not be as critical (or recommended) for cumulative metrics. The utility metering appliance 15 may have a single collection interval in order to simplify collection.

Alternately, vendors of the PPU software products 30 may be permitted to specify their own polling intervals for their software products. The software products 30 may communicate with the utility metering appliance 15 by embedding their specific polling intervals in a header sequence for the software metrics data. The utility metering appliance 15 would then read this polling interval from a header sequence found in the software metrics data transmitted by the metric gathering tool 25. Should multiple software products 30 on the same computer system have the same agent 20 but different polling intervals, the utility metering appliance 15 will choose the lowest polling interval among the software products 30. Multiple polling intervals, where different agents are polled at different intervals, may be possible in cases where the metric gathering tool 25 also acts as a software metering agent 20.

The software metering agent 20 gathers all the software metrics data obtained from the metric gathering tools 25 and transmits the data to the utility metering appliance 15 through the network (step 230). The software metering agent 20 transmits the software metrics data, which are returned by the metric gathering tool 25, to the utility metering appliance 15 without interpreting or analyzing the data. However, the software metering agent 20 does parse the data to obtain parameters such as variable name and value. The exact nature of the software metrics data gathered by the software metering agent 20 remains opaque to the agent 20.

The utility metering appliance 15 stores all of the software metrics data received from the software metering agents 20, and periodically transmits the metrics data to the usage collection and billing system 40 located at the system vendor site for final collection and processing (step 240). The utility metering appliance 15 may package the data from a given periodic interval, compress the data, and transmit the data to the usage collection and billing system 40 via encrypted or otherwise secure transmission periodically. The usage collection and billing system 40 stores the software metrics data and performs further calculations and analysis of different metrics data received from the utility metering appliance 15. For some of the metrics data values, such as cumulative metrics, (which are added continuously over a time period) for example, the usage collection and billing system 40 will determine the initial and final value for a given parameter, as well as the difference between the two. The usage collection and billing system 40 may then forward the calculated metrics data value to at least one billing computer on a periodic basis (e.g. per month).

Each billing computer 45 in turn analyzes the usage from the software metrics data and proceeds to apply business rules for each given PPU software product 30 in order to generate a bill that will be forwarded to the customer (step 260). The business rules are specified by the PPU software product vendor. Each billing computer 45 may reside with the vendor of the overall system 10 or with a PPU software product vendor, depending on how each PPU software product vendor wishes to bill its customers. The web portal 50, moreover, may also display the software metrics data (step 270), enabling the customer to track and monitor usage for the PPU product 30 in a user accessible form (step 280). The web portal 50 is served by the vendor site, typically as a web-based application, available through a public network such as the Internet. The web portal 50 allows only customer or system vendor access through use of a password.

While the invention has been described with reference to the embodiments thereof, it will be appreciated by those of ordinary skill in the art that various modifications can be made to the structure and function of the individual parts of the system without departing from the spirit and scope of the invention as a whole.

The invention claimed is:

1. A software pay-per-use (PPU) system comprising:
    a first computer having one or more PPU software products;
    a metrics gathering tool associated with each of the one or more PPU software products, wherein each metrics gathering tool monitors and measures usage data for its associated one or more PPU software products;
    a software metering agent residing on the first computer, wherein the software metering agent collects the measured usage data from each metrics gathering tool associated with the one or more PPU software products and collects usage data for all of the one or more PPU software products registered with the software metering agent on the first computer;
    a utility metering appliance connected to a plurality of computers, including the first computer, through a network, wherein the utility metering appliance receives the collected usage data from the software metering agent residing on the first computer and other software metering agents residing on other computers connected to the utility metering appliance through the network;
    a usage collection and billing system, wherein the usage collection and billing system periodically receives the collected usage data from the utility metering appliance and processes the collected usage data to generate billing information for PPU software products on the plurality of computers connected to the utility metering appliance through the network; and
    a registry for identifying all of the one or more PPU software products registered with the software metering agent on the first computer, wherein the registry includes identifiers for all of the one or more PPU software products registered with the software metering agent on the first computer and a pathname for each software metering agent associated with each of the one or more PPU software products.

2. The system of claim 1, wherein the software metering agent reads the pathname in the registry to access the associated metrics gathering tool and collect the measured usage data.

3. A software pay-per-use (PPU) system comprising:
    a first computer having one or more PPU software products;
    a metrics gathering tool associated with each of the one or more PPU software products, wherein each metrics gathering tool monitors and measures usage data for its associated one or more PPU software products;
    a software metering agent residing on the first computer, wherein the software metering agent collects the measured usage data from each metrics gathering tool associated with the one or more PPU software products and collects usage data for all of the one or more PPU software products registered with the software metering agent on the first computer;
    a utility metering appliance connected to a plurality of computers, including the first computer, through a network, wherein the utility metering appliance receives the collected usage data from the software metering agent residing on the first computer and other software metering agents residing on other computers connected to the utility metering appliance through the network, wherein the utility metering appliance is located on a standalone computer on the network, and wherein the utility metering appliance is a software program residing on each of the plurality of computers; and
    a usage collection and billing system, wherein the usage collection and billing system periodically receives the collected usage data from the utility metering appliance and processes the collected usage data to generate billing information for PPU software products on the plurality of computers connected to the utility metering appliance through the network.

4. The system of claim 3, wherein the usage data includes a number of input/output (I/O) transactions processed in a given time period.

5. The system of claim 3, wherein the usage data associated with the one or more of the PPU software products is based on one or more of the following: number of users of the system, number of users of a given type, software license level, number of transactions processed per minute, total number of transactions processed, number of files created, sizes of files created, number of keystrokes processed, number of times a specific software product feature has been accessed and number of computers on the system using one or more of the PPU software products.

6. A computer implemented method for generating a bill for using a pay-per-use (PPU) software product, the method comprising:
    measuring usage data associated with one or more PPU software products using a metrics gathering tool at a first computer having one or more PPU software products, wherein one metrics gathering tool is associated with each of the one or more PPU software products;
    collecting the measured usage data from each metrics gathering tool associated with each of the one or more PPU software products using a software metering agent, wherein the software metering agent collects usage data for all of the one or more PPU software products registered with the software metering agent on the first computer;

receiving the collected usage data from the software metering agent residing on the first computer and from a plurality of other software metering agents residing on a plurality of computers, wherein the collected usage data is collected at a utility metering appliance connected to the plurality of computers, including the first computer, through a network;

processing the collected usage data from each metrics gathering tool associated with each of the one or more PPU software products on the first computer received from the utility metering appliance;

generating the bill for using the one or more PPU software products on the first computer based on the processed collected usage data from the first computer; and identifying all of the one or more PPU software products registered with the software metering agent on the first computer by a registry, wherein the registry includes identifiers for all of the one or more PPU software products registered with the software metering agent on the first computer and a pathname for each software metering agent associated with each of the one or more PPU software products.

7. The method of claim 6, further comprising:

reading the pathname in the registry to access the metrics gathering tool associated with the PPU software product; and collecting the measured usage data associated with the PPU software product.

8. A computer readable storage medium containing instructions for generating a bill for using a pay-per-use (PPU) software product, by:

measuring usage data associated with one or more PPU software products using a metrics gathering tool at a first computer having one or more PPU software products, wherein one metrics gathering tool is associated with each of the one or more PPU software products;

collecting the measured usage data from each metrics gathering tool associated with each of the one or more PPU software products using a software metering agent, wherein the software metering agent collects usage data for all of the one or more PPU software products registered with the software metering agent on the first computer;

receiving the collected usage data from the software metering agent residing on the first computer and from a plurality of other software metering agents residing on a plurality of computers, wherein the collected usage data is collected at a utility metering appliance connected to the plurality of computers, including the first computer, through a network;

processing the collected usage data from each metrics gathering tool associated with each of the one or more PPU software products on the first computer received from the utility metering appliance;

generating the bill for using the one or more PPU software products on the first computer based on the processed collected usage data from the first computer; and identifying all of the one or more PPU software products registered with the software metering agent on the first computer by a registry, wherein the registry includes identifiers for all of the one or more PPU software products registered with the software metering agent on the first computer and a pathname for each software metering agent associated with each of the one or more PPU software products.

9. The computer readable storage medium of claim 8, further comprising:

reading the pathname in the registry to access the metrics gathering tool associated with the PPU software product; and collecting the measured usage data associated with the PPU software product.

\* \* \* \* \*